United States Patent [19]
Yamamoto et al.

[11] 4,020,373
[45] Apr. 26, 1977

[54] ROTARY ELECTRIC MACHINE

[75] Inventors: Hiroe Yamamoto, Ibaraki; Noriyoshi Takahashi; Masatoshi Watanabe, both of Hitachi, Japan

[73] Assignee: Hitachi, Ltd., Japan

[22] Filed: Oct. 1, 1975

[21] Appl. No.: 618,341

[30] Foreign Application Priority Data
Oct. 4, 1974 Japan .................. 49-113896

[52] U.S. Cl. .................. 310/61; 310/157; 310/269
[51] Int. Cl.² .................. H02K 1/32
[58] Field of Search .................. 310/157, 55, 57, 58, 310/59, 60, 61, 60 H, 62, 63, 269, 262, 261

[56] References Cited
UNITED STATES PATENTS
3,160,770  12/1964  Aantcheeff .................. 310/157 X

*Primary Examiner*—Donovan F. Duggan
*Attorney, Agent, or Firm*—Craig & Antonelli

[57] ABSTRACT

An end of an end cover provided on a fixed electromagnetic device is arranged in spaced opposition to the side wall of spider arms which are perpendicular to a rotary axis, the spider arms being projected radially from the rotary shaft. The end of the end cover is positioned midway of the spider arms on the radii thereof, thus substantially eliminating the fan loss of the rotary electric machine.

3 Claims, 8 Drawing Figures

ROTARY ELECTRIC MACHINE

The present invention relates to a rotary electric machine, or more in particular to an improvement in the rotary electric machine such as a waterwheel generator having spider arms and employing a cool air ventilation system.

It is well known that a rotary electric machine has a rotor inside a stator, which rotor is rotatably supported on a bearing. Both the rotor and stator have conductors and are undesirably heated themselves by resistance loss, iron loss and like of the conductors. A rise in temperature of the stator and rotor sections must be prevented by appropriate cooling means.

Generally, a method of cooling the stator and rotor is by applying cool air flow. In this method, an air duct for suction and exhaustion is provided between a cooling chamber and the machine proper, so that air cooled in the cooling chamber is applied, by fans mounted on the rotor, along one side or both sides of the rotor through a suction unit wherefrom it is delivered to the cooling chamber again. Heat exchange process is effected while the cool air passes through the rotary machine.

A conventional rotary electric machine employing the air ventilation cooling system is partially shown in FIGS. 1 and 2. Reference numeral 1 shows a rotary shaft, and numeral 2 spider arm fixed on the rotary shaft 1 such that it perpendiculary projects therefrom.

Numeral 3 shows a spider cover arranged such that it is supported on the sides of the spider arm 2 and the spider consists of an upper spider cover 3A and a lower spider cover 3B. Air inlet holes 4A and 4B are formed in the spider covers 3A and 3B respectively so that the cool air flows into adjacent spider arm 2. Numeral 5 shows a yoke arranged on the outer periphery of the spider arm 2, which yoke comprises a plurality of air ducts formed radially with respect to the axis of rotary shaft 1. The yoke 5 and the projecting magnetic pole 7 mounted on the outer periphery of the yoke are cooled by the cool air flowing through the ducts 6. The yoke 5 and the projecting magnetic pole 7 make up an electromagnetic rotor device. Numeral 8 shows a short-circuiting ring inserted to short-circuit the terminals of a brake winding employed for increasing the braking torque and the synchronizing torque of the rotary electromagnetic device. Numeral 9 shows a plurality of fans provided on the ends of the side walls of yoke 5 extending axially therefrom. Numeral 10 shows a stator core disposed in opposition to the projecting magnetic pole 7 and the stator has an armature coil 11. The stator core 10 and the armature coil 11 make up an electromagnetic stator device. Numeral 12 shows a mounting metal member for fastening the electromagnetic stator device to the housing 13. Numeral 14 shows end air holes for applying the warm air flowed through the ends of the armature coil 11 into the housing 13, and numeral 15 an air cooler for cooling the warm air in the housing or rotary electric machine. The housing 13 is mounted on a stand 16 such that it is fixed to the base 17 through the stand 16. Numeral 18 shows an end cover having an outer end fixed on the housing 13. The end cover covers an axial end portion of the electromagnetic stator device and the electromagnetic rotor device and extends to the vicinity of the side of the fans 9, where the cover is open-ended.

In the rotary electric machine of air ventilation cooling type constructed as mentioned above, air flows in the directions shown by arrows in the rotary electric machine in operation. Cool air flowing out from the air cooler 15 is separated in the directions A and B as shown by the arrow and flows along the outer periphery of the end cover 18 divided into two parts, upper and lower, so that part C of the cool air enters the spider arms 2 through the air inlet holes 4A and 4B, while another part D of the air is led into the end cover 18 by the fans 9. Part E of the cool air led into the spider arms 2 makes its way through the air ducts 6 on the yoke 5 thereby to cool the yoke 5 and the projecting magnetic pole 7. The part F of the cool air introduced into the end cover 18 cools the electromagnetic rotor device and the electromagnetic stator device from the outer peripheries thereof. Still another part G of the cool air cools the ends of the armature coil 11, then enters the housing 13 by way of the end air inlet hole 14 and returns to the air cooler 15. The aforementioned processes are repeated to cool the rotary electric machine.

In the rotary electric machine having this configuration, air flow characteristics which do not adversely affect the operation of the electric machine are attainable by providing the fans 9. In spite of this, the fan loss is so large that it has been difficult to obtain an electric machine having a high efficiency.

According to the present invention, there is provided a rotary electric machine comprising a rotary shaft, a plurality of spider arms projecting from the rotary shaft, an electromagnetic rotor device arranged on the outer periphery of the spider arms, an electromagnetic stator device arranged in spaced opposition to the electromagnetic rotor device, and an end cover covering an axial end of the electromagnetic stator device, wherein the inner end of the end cover is arranged midway on the radii of the spider arms.

The above and other objects, features and advantages will be made apparent by the detailed description taken in conjunction with the accompanying drawings, in which.

The present invention will be described in detail below with reference to the embodiments shown in the drawings. In the drawings, like reference numerals denote like component elements as in the conventional machine shown in FIG. 1.

Figure 1:
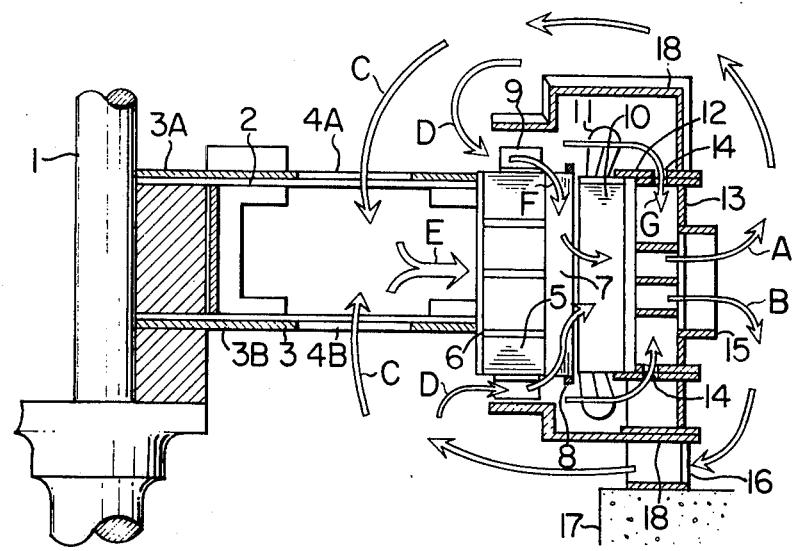
FIG. 1 is a longitudinal sectional view showing a conventional rotary electric machine.
Figure 2:
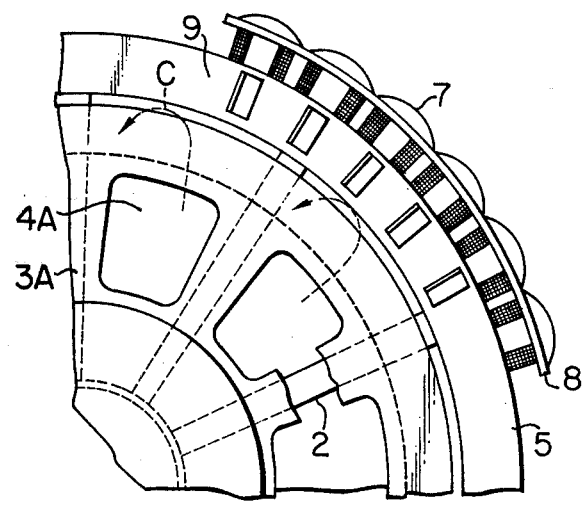
FIG. 2 is a top plan view showing part of the machine of FIG. 1.
Figure 3:
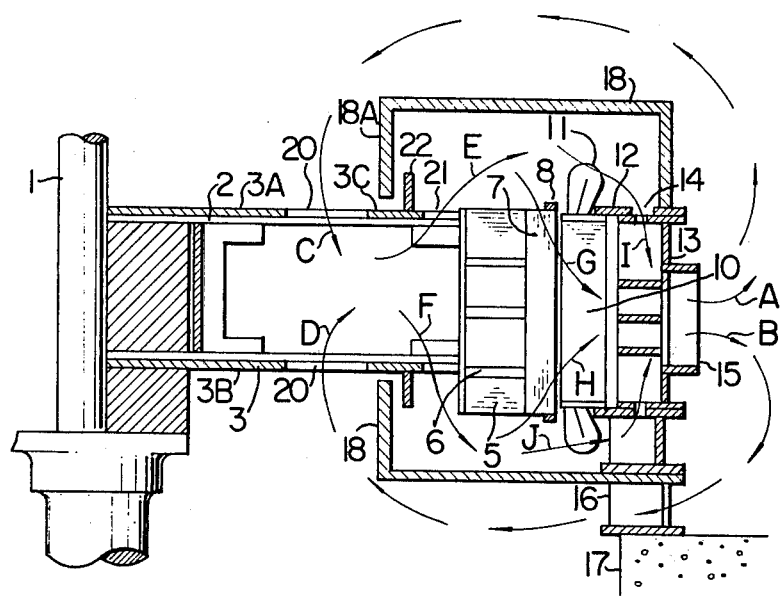
FIG. 3 is a longitudinal sectional view showing a rotary electric machine according to an embodiment of the invention.
Figure 4:
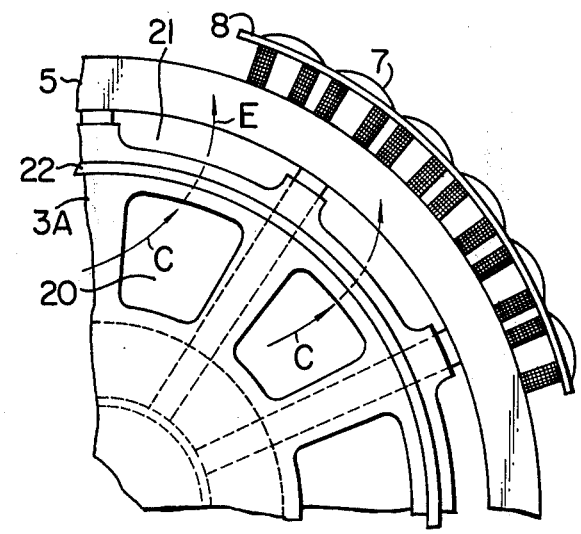
FIG. 4 is a top plan view thereof.

Part of the rotary electric machine according to the present invention is shown in FIGS. 3 and 4. The peripheral arrangement of the stator and the rotor are substantially the same as that of the above-mentioned conventional machine and will not be described here in detail. The detailed description below, therefore, is limited to the component elements and parts specially related to the invention and construction thereof.

The rotary electric machine according to the present invention has a plurality of spider arms extending radially from the rotary shaft 1 and a spider cover 3 for covering the spider arms 2 at the axial end of the spider arms 2.

The spider arms 3 are provided with a plurality of inner air inlet holes 20 and outer air inlet holes 21, each of which is smaller than the space between adjacent spider arms 2. The inner end 18A of the end cover 18 with its outer end fixed on the housing 13 extends to the proximity of the spider cover 3C between the inner air inlet hole 20 and the outer air inlet hole 21. In order to partition the inside and outside of the cover 18 in fluid fashion, the inner end 18A of the end cover 18 is arranged in slightly spaced relation with the spider cover 3. The airenclosing or sealing capacity is further enhanced by a guide 22 fixed on the spider cover 3C, thus making up a maze of air passages.

In the rotary electric machine having the above-mentioned construction, cool air flows in the directions as shown by arrows while the machine is running. In other words, the cool air flowing out from the air cooler is separated in the directions A and B as shown by the arrow, upper and lower, and flows along the outer periphery of the end cover 18, applied into the space between adjacent spider arms 2 by way of the inner air inlet hole 20 provided in the spider cover 3. The cool air parts C and D which have entered the inside of the spider arms 2 pass through the air ducts 6 thereby to cool the yoke 5, the projecting magnetic pole 7 and like. The cool air parts E and F that could not enter the inside of the air ducts 6 proceed toward the inside of the end cover 18 through the outer air inlet hole 21. Parts G and H of the cool air parts E and F led to the inside of the end cover 18 pass through ducts (not shown) between the field pole of the electromagnetic rotor device and the core of the electromagnetic stator device thereby to cool the same. The other cool air parts I and J, on the other hand, cool the ends of the armature coil 11, make their way into the housing 13 through the end air inlet holes 14, and again return to the air cooler 15. These cool air parts are circulated in this manner thereby to cool the rotary electric machine.

In this way, the present invention takes advantage of the cool air to such a degree that better airflow characteristics and cooling efficiency are attained. Especially, the cool air parts led inwardly of the spider cover 3 and the end cover 18 never leak outside and therefore substantially all the cool air flowed in may be fully effectively utilized without any windage loss. As a result, an airflow characteristic as effective as that for the conventional construction provided with fans may be attained. In other words, the present invention completely eliminates the loss the conventional machine suffered from due to the fans, without affecting the flow of the cool air.

Figure 5:
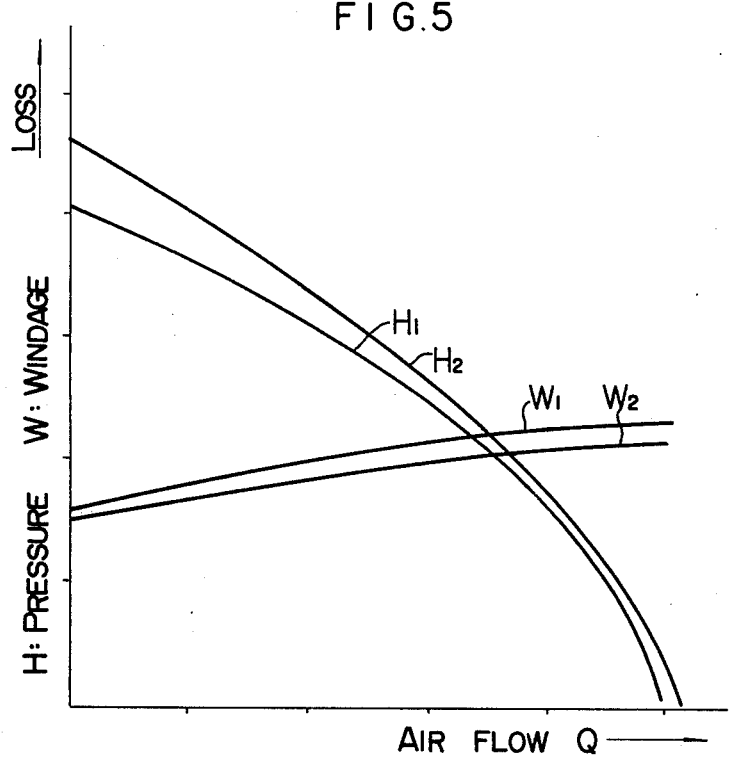
FIG. 5 shows an airflow-pressure characteristics and windage loss characteristics of the rotary electric machines constructed according to the conventional method and the present invention.

The diagram of FIG. 5 shows a comparison between the airflow-pressure characteristic and the windage loss characteristic of the conventional machine construction with fans and the construction of the invention. In the drawing, $H_1$ shows the airflowpressure characteristic of the conventional machine having fans and $H_2$ that of the present invention. $W_1$ shows the windage loss characteristic of the conventional construction with fans and $W_2$ that of the invention. As will be understood from this comparison diagram, the construction of the present invention has an improved airflow-pressure characteristic and a reduced windage loss as compared with the conventional construction having the fans.

Even though the foregoing description refers to the case in which an annular member is fixed on the spider cover 3 to form a maze in partitioning air between inside and outside of the end cover 18, other systems may of course be employed to achieve the same purpose.

Figure 6:
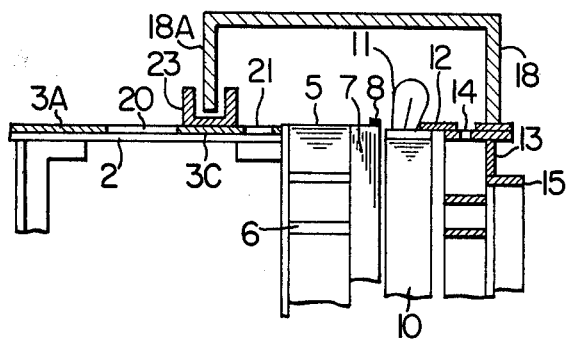
FIGS. 6, 7 and 8 are longitudinal sectional views showing other embodiments of the invention.
Figure 7:
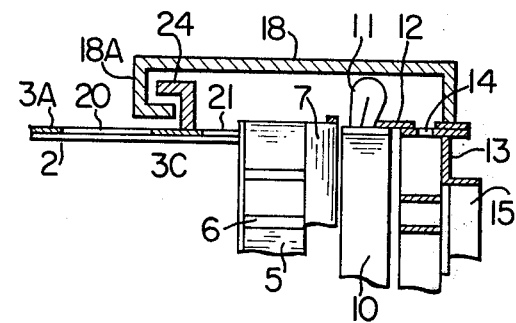
Figure 8:
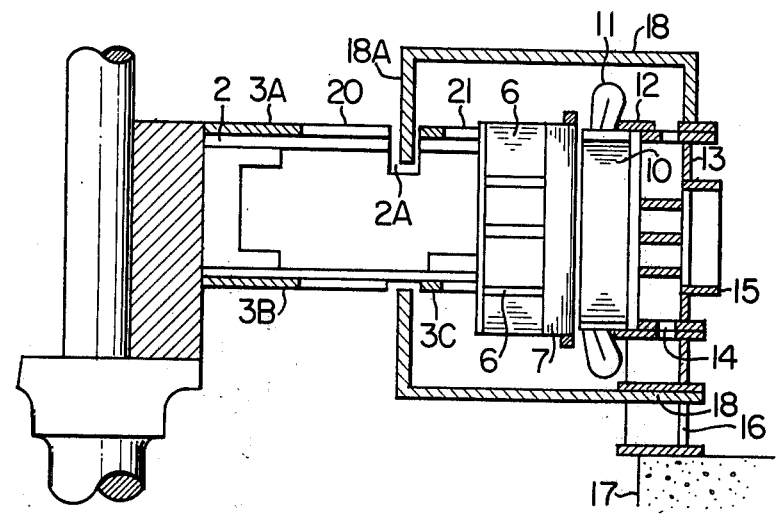

Other embodiments are illustrated in FIGS. 6 to 8 inclusive. These three embodiments are identical in that a plurality of inner air inlet holes 20 and outer air inlet holes 21 are provided in the spider cover 3, but they are different in the end cover 18 and the guide arranged between the inner air inlet holes 20 and the outer air inlet holes 21. The description of these embodiments are made below with reference to the drawings.

The embodiment of FIG. 6 has an axially open concave guide 23, the recess of which is adapted to accomodate an end 18A of the end cover 18.

In the embodiment shown in FIG. 8, each of the spider covers 3A and 3B is divided into two parts, and the spider arm 2 of the spider cover 3A is provided with a recess 2A, in which an end 18A of the end cover 18 is arranged.

The above-mentioned various embodiments have quite the same effect as the first-mentioned embodiment. Although all the embodiments described above have the spider cover 3, it may be done without. Instead, an inner end of the end cover may with equal effect be arranged midway on the radii of the spider arms.

The rotary electric machine according to the invention as described above has the inner end of the end cover arranged midway on the radii of the spider arms, so that the spider arms satisfactorily functions as fans. Especially, even in the absence of fans for circulating the cool air, it can be circulated. Also, suction passage and exhaust passage are formed inside and outside respectively with respect to the inner end of the end cover, thus permitting smooth flow of the cool air, resulting in an improved air flow characteristic and cooling efficiency. Further, the windage loss which the fans of the conventional rotary electric machine suffered from is completely eliminated.

What is claimed is:

1. A rotary electric machine comprising a rotary shaft, a plurality of spider arms projecting radially from said rotary shaft, an electromagnetic rotor device arranged on the outer periphery of said spider arms, an electromagnetic stator device disposed opposite to said electromagnetic rotor device with a predetermined space therebetween, an end cover for covering axial sides of said electromagnetic stator device, said end cover having an inner end thereof arranged midway on the radius of said spider arms in slightly spaced relationship with the side wall of said arms so as to provide a small space therebetween and, a spider cover on the side of said spider arms axially thereof, said spider cover having at least one inner and outer air inlet hole, each air inlet hole being smaller than the space between adjacent ones of said spider arms, said inner air inlet hole being situated at a position on said spider cover a smaller distance from said rotary shaft then said outer air inlet hole, said end cover having an end thereof positioned between said outer air inlet hole and said inner air inlet hole in slightly spaced relation with said spider cover.

2. A rotary electric machine according to claim 1, in which said small space between said end cover and said spider cover forms a maze radially of said rotary shaft.

3. A rotary electric machine according to claim 1, in which that end of said spider cover which is in opposition to said end cover is provided with an annular embankment protruding toward said end cover, and a small space is formed between an end of said embankment and an end of said end cover.

* * * * *